April 9, 1963   R. S. VON AHLEFELDT   3,084,557
ACCELEROMETER
Filed July 19, 1957

INVENTOR
R.S. von AHLEFELDT
BY A. Yates Dowell I + II
ATTORNEYS

United States Patent Office 3,084,557
Patented Apr. 9, 1963

3,084,557
ACCELEROMETER
Rolf S. Von Ahlefeldt, 1325 Greenwood St., Pueblo, Colo.
Filed July 19, 1957, Ser. No. 672,926
9 Claims. (Cl. 73—516)

The present invention relates to measurement of motion and more particularly to the measurement of acceleration resulting from a change of velocity of objects moving in space whether in a guided path or freely movable.

Heretofore acceleration forces have been measured by various mechanical and some electrically responsive measuring devices, but none of the prior art structures have been altogether satisfactory due to the difficulty of obtaining consistently accurate readings throughout a sufficiently wide range and the difficulty in transmitting such readings to obtain useable information at remote observation points.

An object of the present invention is to provide an acceleration measuring device which overcomes the difficulties of the prior art and which is extremely rugged, highly sensitive over a wide range yet easily constructed and easily used.

Another object is to provide an electronic acceleration measuring device which will accurately measure and transmit the measurements for use by observers.

A further object is to provide an accelerometer in which the changes of density of a gas serve as a measure of acceleration.

A still further object is to provide a motion measuring device which is equally responsive to both small and large changes in acceleration, and/or deceleration.

Figure 1:
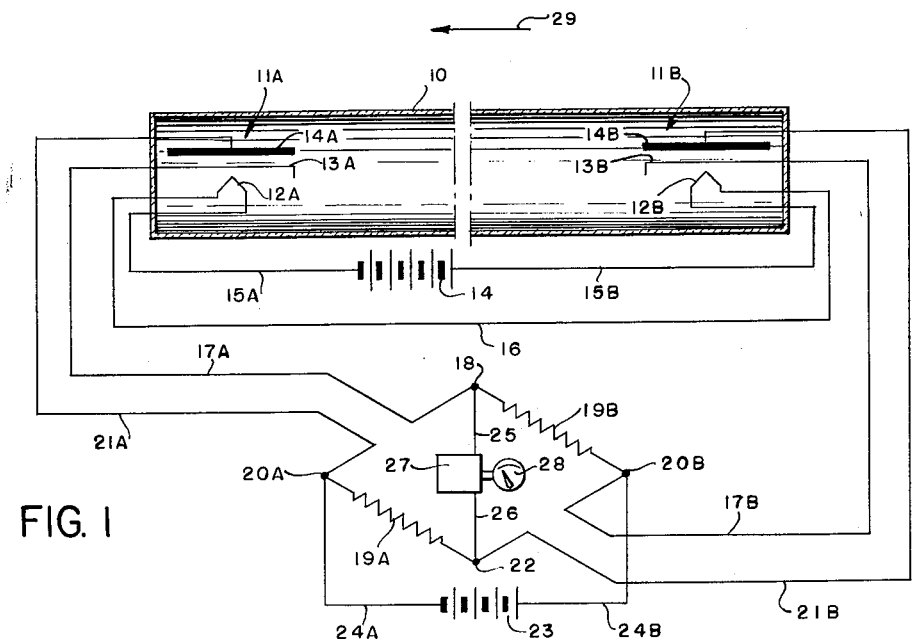
Figure 2:
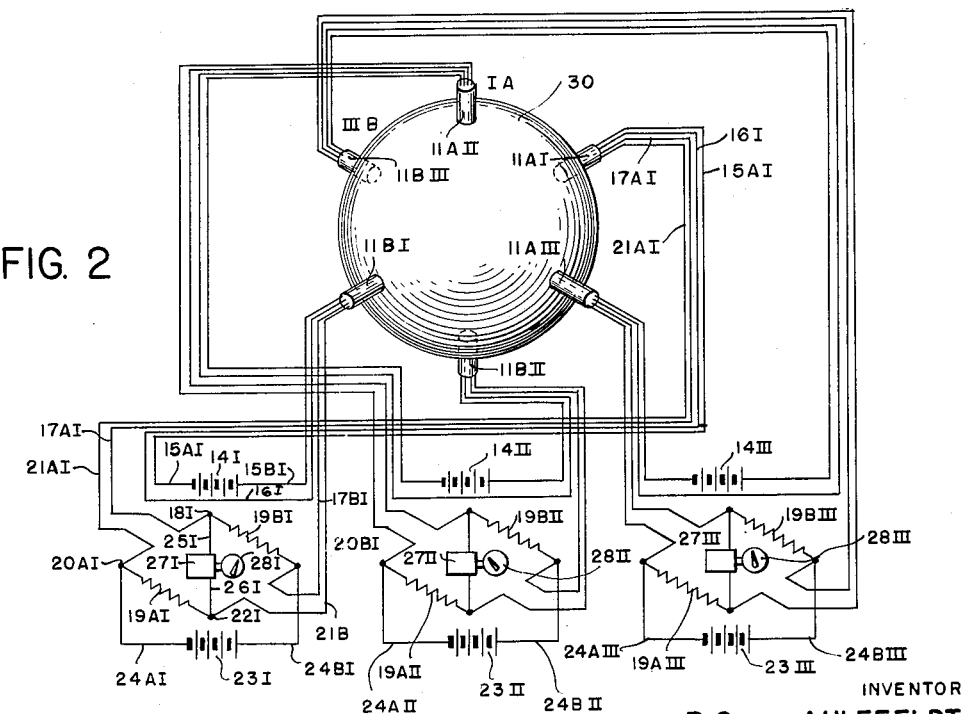

Other and further objects will be apparent from the following description taken in conjunction with the accompanying drawing wherein:

FIG. 1 is a diagrammatic illustration of the wiring diagram and the two sensing elements at opposed ends of a closed tube; and FIG. 2, a diagrammatic illustration of a modified form of the invention for measuring changes in motion in all directions of movement.

Briefly, the present invention includes a gas tight enclosure having one or more sensing elements, i.e. diodes, triodes, etc. therein with connections between the cathodes and the plates and with means for measuring the differential in the flow of electricity from a source of supply between a cathode and its associated plate. The flow of current has been found to be at least partially dependent upon the density of the gas around the particular sensing element. Suitable heating means are provided for each sensing element to obtain the desired flow of electrons. In one form of the invention a plurality of pairs of sensing elements are provided in opposed relation in a single spherical enclosure whereby the simultaneous measurement of motion in all three planes may be obtained; either in planes x, y and z, or as a single vector, through proper integrating circuits.

Referring more particularly to FIG. 1 an enclosure 10 of suitable material such as glass or the like is filled with a gas at a suitable pressure for the degree of ionization and a first sensing element 11A having a heater 12A for causing electrons to be emitted from a cathode 13A to a plate 14A is mounted at one end of the enclosure 10 while a second sensing element 11B having a heater 12B, a cathode 13B and a plate 14B is mounted at the other end of the enclosure with suitable leads extending outside of the enclosure. The heaters are supplied with current from a source of electricity such as a battery 14 having suitable leads 15A, 15B to the heaters 12A and 12B respectively with the circuit being completed by a lead 16.

The cathode 13A is provided with a lead 17A extending to a juncture 18 to which a resistance 19B is connected at one end to the juncture 18 and at its other end to a juncture 20B which is connected by a lead 17B to the cathode 13B.

The plate 14A is connected by a lead 21A to a juncture 20A to which a second resistance 19A is connected at one of its ends, the other end of the resistance 19A being connected to the juncture 22. Extending from the juncture 22 to the plate 14B is a lead 21B.

A source of current such as a battery 23 supplies current through leads 24A and 24B to junctures 20A and 20B respectively.

Extending between junctures 18 and 22 are leads 25 and 26 respectively which are connected to an amplifier 27 which serves to amplify any current passing between junctures 22 and 18 to obtain a reading on a meter 28 which is preferably calibrated to give a direct reading of acceleration.

It is also contemplated that the amplifier 27 may send out signals by a suitable telemetering circuit which may be received at an appreciable distance from the structure above described.

To illustrate the operation, it is assumed that the tube 10 is accelerated along its axis in the direction of the arrow 29, the contained gas due to the inertia of its molecules and low viscosity at the pressure used, becomes less dense at the leading end about the sensing element 11A causing its current flow to diminish. The contained gas becomes more dense at the trailing end about sensing element 11B causing its current flow to increase. The consequent unbalancing of the bridge circuit 25, 27 and 26 causes a proportionate current to flow across the bridge 25, 27 and 26 and this current after passing through the amplifier 27 may be read on the meter 28 in terms of acceleration or transmitted by FM or telemetering system to a remote receiving station.

It should be noted that the tube may be made with a single end with control grids. Also, a plurality of the tubes 10 with a sensing element at each end may be placed in different planes to serve as an integrating accelerometer. Similarly, a plurality of tubes with a single triode or other device with control grids or transistors may be used in a similar manner.

The accelerometer illustrated in FIG. 1 is particularly useful in measuring acceleration in one plane including forward and reverse acceleration. Upon reference to FIG. 2, a modification of the invention includes an enclosure 30 which is shown as being spherical with three or more pairs of sensing elements arranged on axes at right angles to each other.

A first pair of sensing elements 11BI and 11AI are arranged on one axis while another pair of sensing elements 11BII and 11AII are arranged at right angles to the axis of sensing elements 11BI and 11AI. A third pair of sensing elements 11BIII and 11AIII are arranged on an axis at right angles to the plane defined by the axis of sensing elements 11BI, 11AI, and 11BII, 11AII. It will be apparent that a gas at suitable pressure to obtain the desired degree of ionization is provided within the spherical enclosure 30 and that the sensing elements in this illustration are triodes and are provided with the conventional heater, cathode, and plate. However, any suitable sensing device, tube, crystal, or transistor could be used. The wiring diagram shown in FIG. 2 is similar to the wiring diagram for FIG. 1 with each pair of sensing elements being connected to a suitable source of electric energy for the heater and for the bridge connection between the leads from the cathodes and plates.

To avoid excessive repetition of the description, the same reference numerals are used for each opposed pair of diodes as that used in FIG. 1 with the additional designation of the Roman numerals I, II, or III to designate the particular pair of sensing elements and the leads, sources of electrical energy and meters, such Roman numerals following the reference character designation of FIG. 1.

Referring to the pair of sensing elements 11AI, and 11BI, the heaters are supplied with energy from the battery 14I by means of lead 15BI to the heater in sensing element 11BI while the lead 15AI is connected to the heater in sensing element 11AI with a common connection 16I between the heaters.

Current from the cathode of sensing element 11AI is carried by a lead 17AI to the juncture 18I which is connected to one end of the resistance 19BI which has its other end connected to the juncture 20BI, a lead 17BI being connected from the juncture 20BI to the cathode 13BI (not shown). Similarly the plate 14AI is connected by lead 21AI to a juncture 20AI which is connected to one end of a resistance 19AI, the other end of the resistance being connected to juncture 22I which is connected by means of a lead 21B to the plate 14BI (not shown).

A bridge formed from lead 25I and lead 26I extends from junctures 18I and 22I to an amplifier 27I which is connected to a meter 28I which measures the acceleration in the direction of the axis between sensing elements 11BI and 11AI, a battery 23I supplies current through leads 24AI and 24BI to juncture 20AI and 20BI respectively and when there is no acceleration on the axis between sensing elements 11BI and 11AI, no current would flow across the bridge 25I, 27I, and 26I and consequently there would be no reading on meter 28I since the resistances 19AI and 19BI are the same. However, when the density of the gas within the enclosure 30 varies to provide a differential in densities at the diodes 11BI and 11AI, current will flow through the bridge resulting in a meter reading which will indicate acceleration or deceleration in the direction of the said axis.

Similarly, the meter 28II measures the acceleration on the axis between sensing elements 11AII and 11BII, a meter 28III measures the acceleration on the axis between sensing elements 11AIII and 11BIII. The reference numerals have been applied to the circuits for the sensing elements 11BIII, 11AIII with the suffix III after the numerals corresponding to FIG. 1. The circuits extending to the sensing elements 11AII and 11BII have been similarly identified with the suffix II. Since no useful purpose would be accomplished by repetition the detailed description has been omitted.

It will therefore be apparent that the resultant acceleration can be determined from the readings of the meters 28I, 28II and 28III. This resultant acceleration may be obtained by suitable integrating mechanism, by vector analysis or any other suitable means.

The present invention is particularly useful in the control and tracking of guided missiles since a change in direction of movement is due to acceleration forces and such acceleration forces can be measured simultaneously in all three planes whereby the path of the guided missile can be accurately traced. Further, the present invention is particularly useful in the control and guidance of a guided missile or rocket since the acceleration forces as measured by the amplifier and meter can be used to control the guidance and the propulsion of the missile or rocket to obtain the desired results.

The invention also has broad application wherever accelerations are to be measured. Further, the acceleration forces will produce an electronic response which may be transmitted by radio or other means to any desired control or observation point thereby making the invention useful in the tracking and/or control of an artificial satellite or the like.

It will be obvious to those skilled in the art that various changes may be made in the invention without departing from the spirit and scope thereof and therefore the invention is not limited by that which is illustrated in the drawing and described in the specification, but only as indicated in the accompanying claims.

I claim:

1. An accelerometer comprising an enclosure having a gas therein, a first sensing element having a cathode, and and plate located at one end of said enclosure, a second sensing elements having a cathode, and a plate located at the other end of the said enclosure, a first circuit including a first resistance connecting said cathodes, a second circuit including a second resistance connecting said plates, a bridge circuit including an amplifier extending between the first cathode end of said first resistance and the second plate end of said second resistance, and a source of electric potential between the second cathode end of said first resistance and the first plate end of said second resistance whereby the accelerating forces on said enclosure in a direction in line with said ends will produce a flow of current in said bridge circuit indicating the force or magnitude of acceleration in said direction.

2. The invention according to claim 1 in which at least third and fourth sensing elements are arranged in spaced relation in the enclosure and transversely to said first and second sensing elements and circuits are provided for each pair of sensing elements to measure acceleration in the directions between each pair and means are provided to transmit the record of said flow of current through said circuits:

3. An accelerometer comprising an enclosure having a gas therein, a pair of sensing elements, each sensing element including a cathode, and a plate at opposed ends of said enclosure with the gas in said enclosure being free to pass between said opposed ends whereby the pressure in said enclosure is normally uniform during periods when the enclosure is not subject to accelerating forces, means to measure the density and corresponding concentration of ionized particles of the gas at each end of said enclosure in accordance with the flow of electrons between said cathode and plate at each end and means to measure the difference between said flow of electrons whereby the accelerating forces in a line of movement between said ends can be measured.

4. The invention according to claim 3 in which the enclosure is of the vacuum tube type and has at least three pairs of opposed sensing elements each, including a cathode, and a plate whereby the accelerating forces can be determined in all directions each pair of sensing elements being arranged transversely to the other pair of sensing elements.

5. The invention according to claim 3 in which the enclosure and sensing elements are of the vacuum tube type.

6. An accelerometer comprising an enclosure having a gas therein, a pair of sensing elements, each element including a pair of electrodes at opposed ends of said enclosure with the gas in said enclosure being free to pass between said opposed ends whereby the pressure in said enclosure is normally uniform during periods when the enclosure is not subject to accelerating forces, means to measure the corresponding concentration of particles of the gas at each end of said enclosure in accordance with the flow of electrons between the electrodes of each pair of electrodes at each end and means to measure the difference between said flow of electrons whereby the accelerating forces in a line of movement between said ends can be measured.

7. The invention according to claim 6 in which the enclosure is of the vacuum tube type and has at least three pairs of opposed sensing elements each including a pair of electrodes, whereby the accelerating forces can be determined in all directions, each pair of sensing elements being arranged transversely to the other pair of sensing elements.

8. An accelerometer comprising an enclosure having a gas therein, a first sensing element having a heater, a cathode, and a plate located at one end of said enclosure, a second sensing element having a heater, a cathode, and a plate located at the other end of the said enclosure, a first circuit including a first resistance connecting said cathodes, a second circuit including a second resistance connecting said plates, a bridge circuit including an amplifier extending between the first cathode end of said first resistance and the second plate end of said second resistance, and a source of electric potential between the second cathode end of said first resistance and the first plate end of said second resistance whereby the accelerating forces on said enclosure in a direction in line with said ends will produce a flow of current in said bridge circuit indicating the force or magnitude of acceleration in said direction.

9. The invention according to claim 2 in which fifth and sixth sensing elements are arranged in spaced relation in the enclosure and transverse to said first and second sensing elements and transverse to said fourth and fifth sensing elements and circuits are provided for each pair of sensing elements to measure the acceleration in the directions between each pair of sensing elements and means are provided to transmit the record of said flow of current through said circuits.

References Cited in the file of this patent

UNITED STATES PATENTS

| | | |
|---|---|---|
| 1,697,339 | Baker | Jan. 1, 1929 |
| 2,155,420 | Gunn | Apr. 25, 1939 |
| 2,334,356 | Salzberg et al. | Nov. 16, 1943 |
| 2,455,394 | Webber | Dec. 7, 1948 |
| 2,611,268 | Mellen | Sept. 23, 1952 |
| 2,728,868 | Peterson | Dec. 27, 1955 |

FOREIGN PATENTS

| | | |
|---|---|---|
| 278,905 | Germany | Oct. 7, 1914 |